(12) United States Patent
Nakajima

(10) Patent No.: US 6,779,826 B2
(45) Date of Patent: Aug. 24, 2004

(54) ATTACHMENT STRUCTURE FOR A CENTER DISPLAY UNIT

(75) Inventor: Hirokatsu Nakajima, Nagoya (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/345,214

(22) Filed: Jan. 16, 2003

(65) Prior Publication Data

US 2003/0146640 A1 Aug. 7, 2003

(30) Foreign Application Priority Data

Feb. 6, 2002 (JP) ........................................ 2002-029841

(51) Int. Cl.[7] .............................................. B60K 37/02
(52) U.S. Cl. ........................ 296/70; 307/10.1; 381/86; 439/34
(58) Field of Search .............................. 296/70; 307/9.1, 307/10.1, 147; 381/86; 439/34

(56) References Cited

U.S. PATENT DOCUMENTS

| | | | | |
|---|---|---|---|---|
| 4,807,292 A | * | 2/1989 | Sorscher ...................... 381/86 |
| 5,873,749 A | * | 2/1999 | Takiguchi et al. ........... 439/534 |
| 5,889,337 A | | 3/1999 | Ito et al. ..................... 307/10.1 |
| 6,352,433 B2 | * | 3/2002 | Hayashi ........................ 439/34 |
| 6,505,876 B1 | * | 1/2003 | Watanabe ..................... 296/70 |
| 2003/0146640 A1 | * | 8/2003 | Nakajima ..................... 296/70 |
| 2004/0056503 A1 | * | 3/2004 | Brancheriau ................. 296/70 |

FOREIGN PATENT DOCUMENTS

JP 01-164646 A * 6/1989 .................. 439/34

* cited by examiner

Primary Examiner—D. Glenn Dayoan
Assistant Examiner—Paul Chenevert
(74) Attorney, Agent, or Firm—Oliff & Berridge, PLC

(57) ABSTRACT

A display unit attachment structure that attaches a display unit to an instrument panel of an automobile includes a pair of brackets projecting toward a compartment from the instrument panel, each of the brackets having a guide groove. An instrument panel-side connector is fixed with respect to a surface of the instrument panel between the brackets. The display unit has a main body including two side walls, and guide pins project from each of the two side walls. A display unit-side connector is fixed with respect to a back surface of the main body. The display unit is attached to the brackets by sliding the guide pins in the guide grooves, whereby the at least one second connector is automatically connected with the first connector.

8 Claims, 6 Drawing Sheets

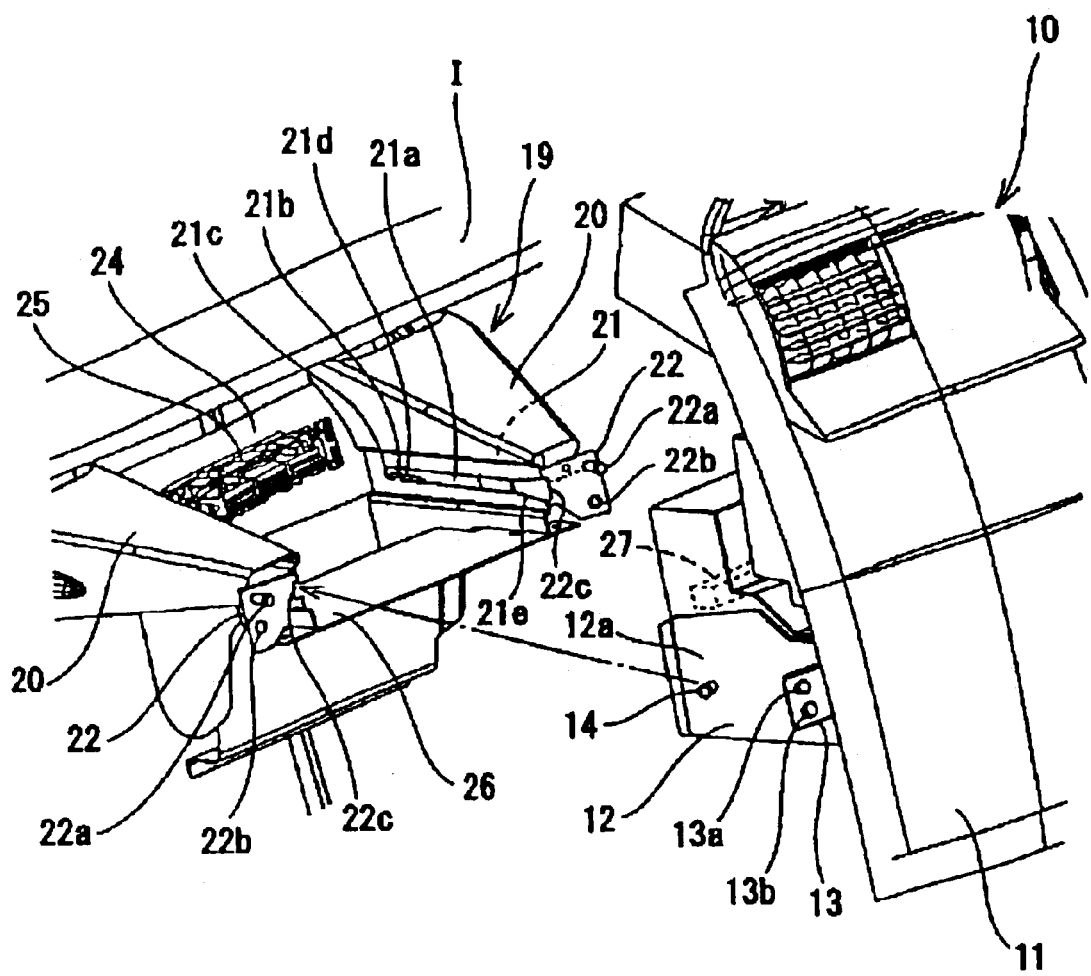
[Fig. 1]

[Fig. 2]
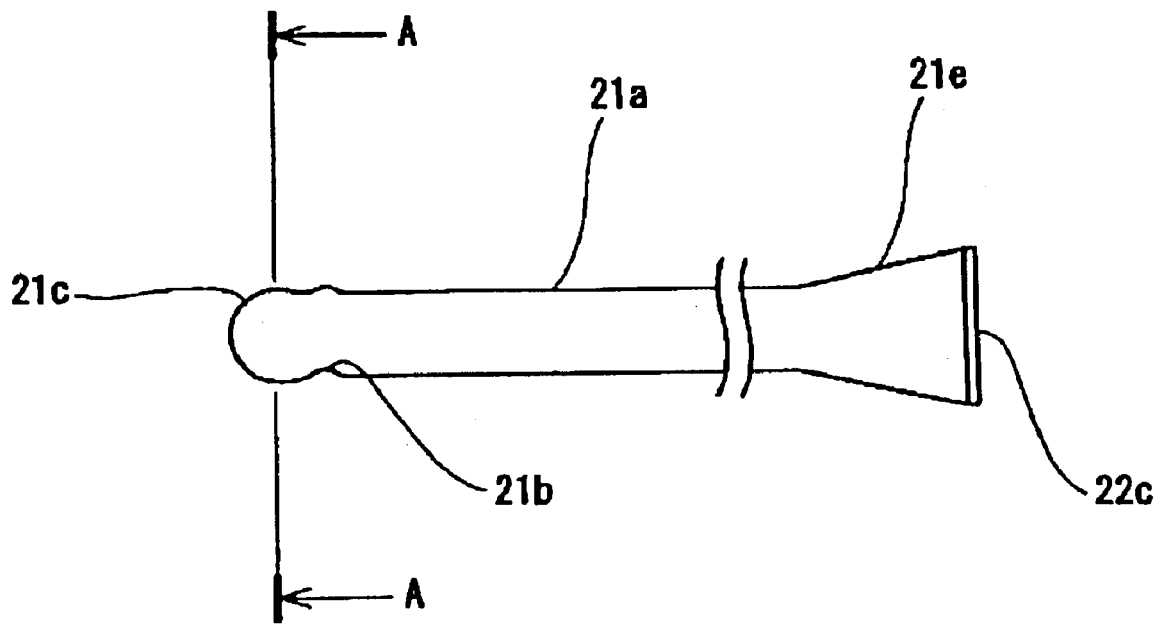
[Fig. 3]
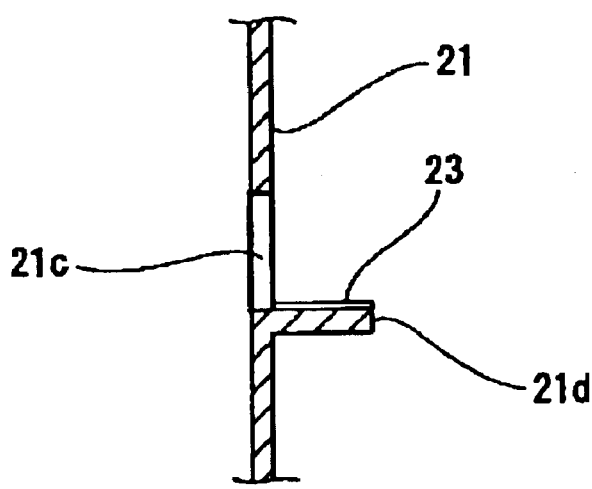

[Fig. 4 (A)]
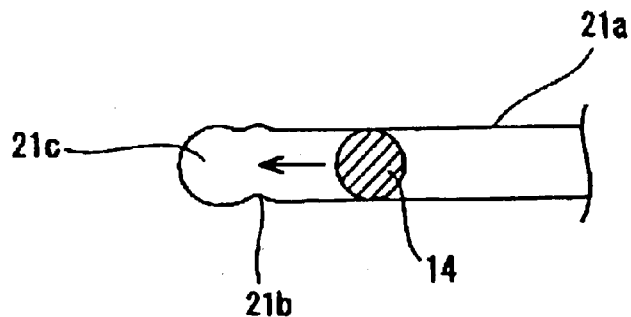
[Fig. 4 (B)]
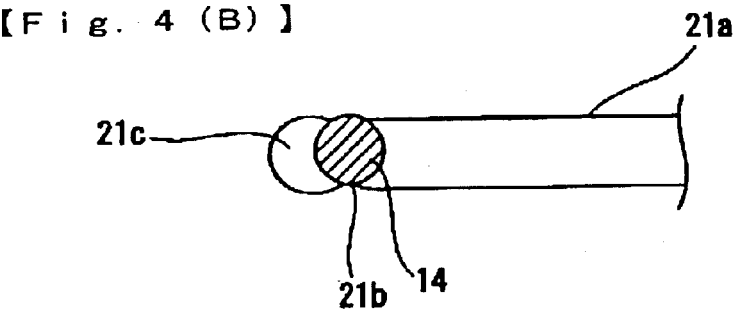
[Fig. 4 (C)]
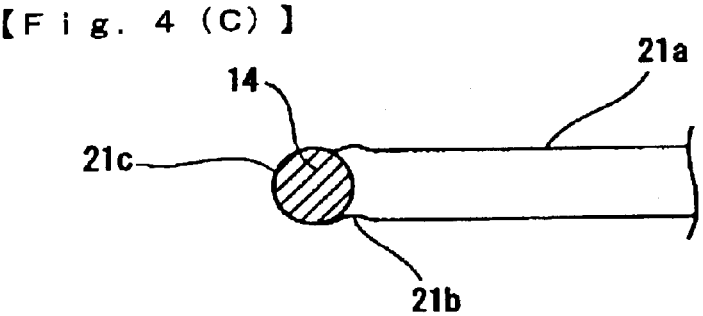
[Fig. 5]
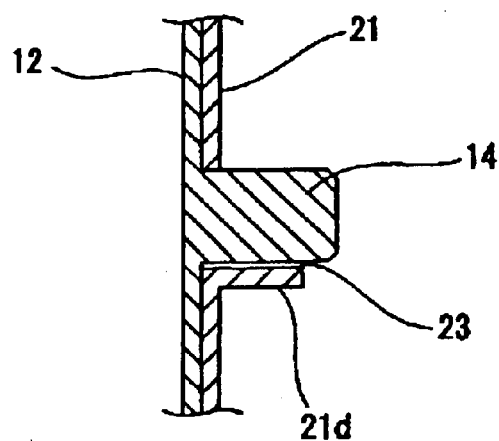

[Fig. 6(A)]
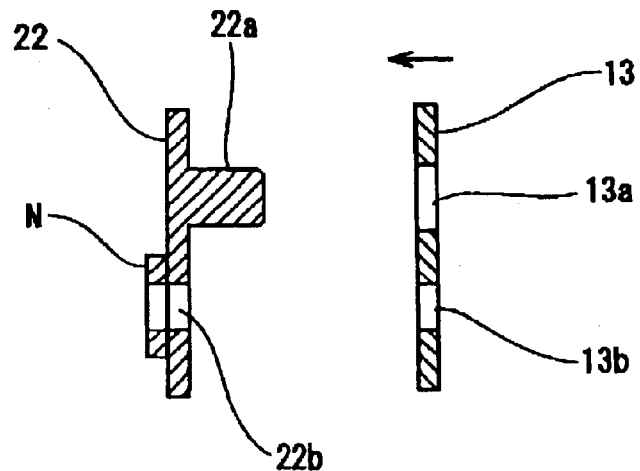
[Fig. 6(B)]
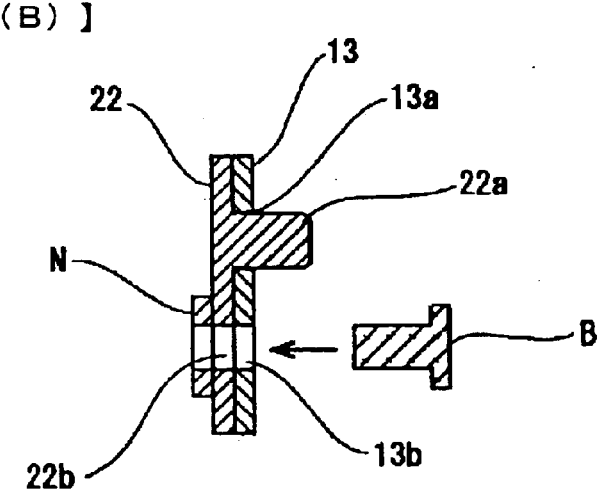
[Fig. 6(C)]
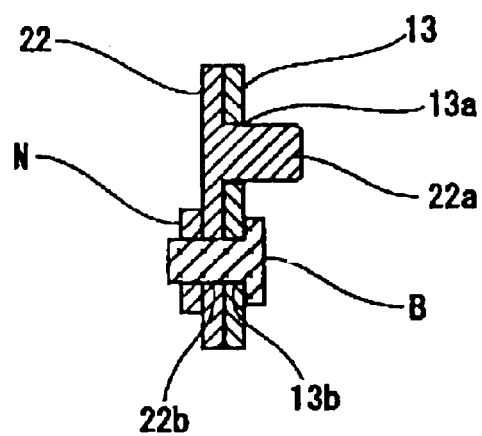

[Fig. 7]
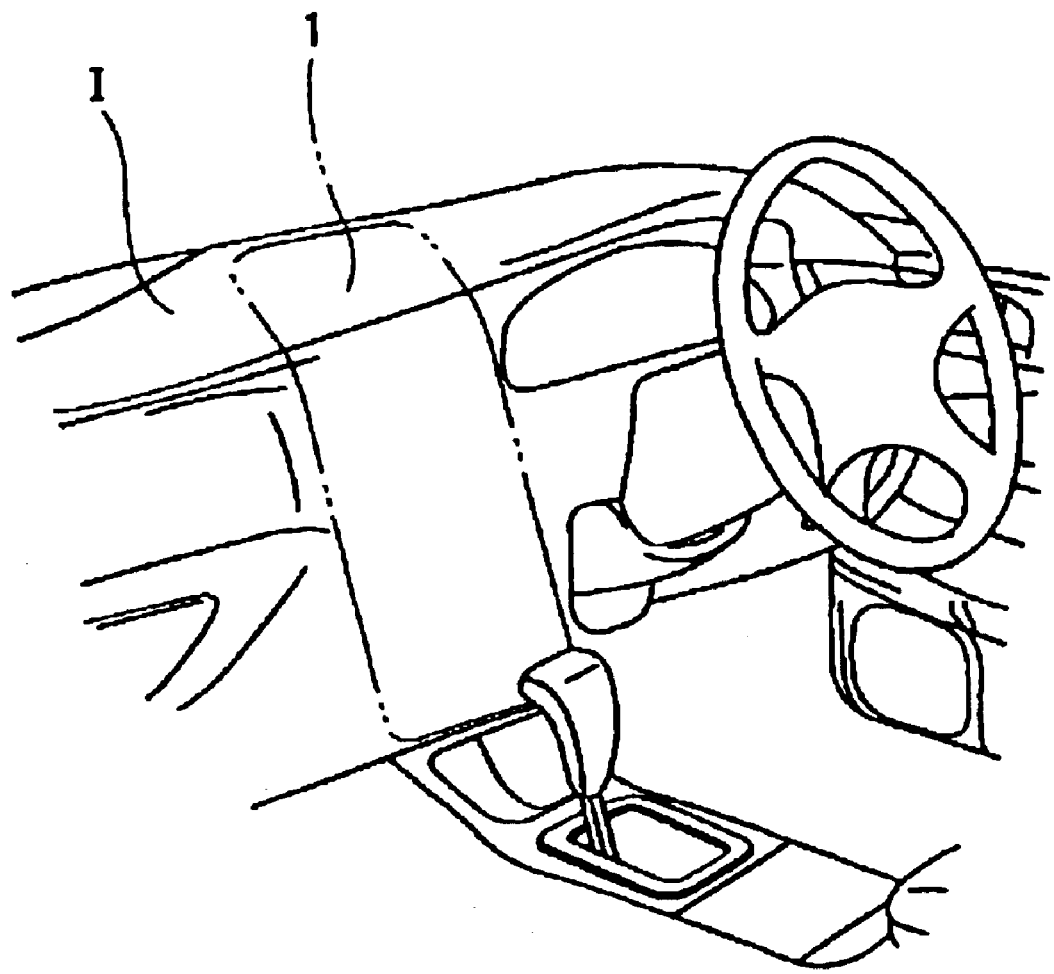
PRIOR ART

[Fig. 8]
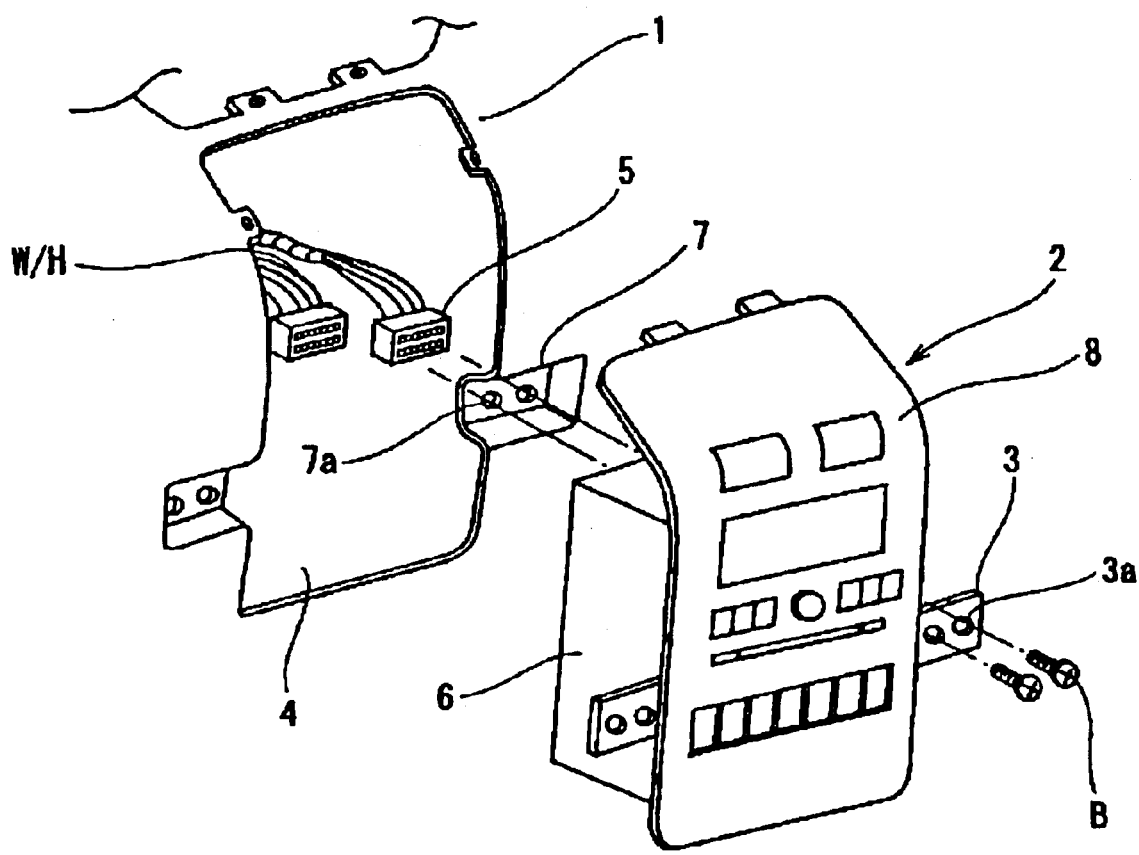
PRIOR ART

ATTACHMENT STRUCTURE FOR A CENTER DISPLAY UNIT

BACKGROUND OF THE INVENTION

1. Field of Invention

The present invention relates to an attachment structure for a display unit, such as a structure for fixing a center display unit (hereinafter referred to as "CDU") or the like to an instrument panel while positioning the CDU and, at the same time, connecting connectors that are attached to the CDU with connectors that are provided inside the instrument panel.

2. Description of Related Art

Conventionally, as shown in FIG. 7, a center display unit (abbreviated as "CDU") is provided as a module, in which manipulation devices, indicators, and/or the like of audio equipment, an air conditioner, and/or the like are provided. The CDU is fixed to an instrument panel I of an automobile at a central portion 1 that is located between the driver's seat and the front passenger seat.

An exemplary procedure of attaching the above-described CDU to the automobile body is as follows. As shown in FIG. 8, connectors 5 that are connected to ends of a wire harness W/H that is provided inside the instrument panel I are manually engaged with connectors (not shown) that are provided on the back surface of a main body 6 of a CDU 2 through an opening 4 of the instrument panel I provided in the central portion 1. Then, the main body 6 of the CDU 2 is attached to the instrument panel I so as to be housed in the opening 4, and is fixed to the instrument panel I by screwing bolts B into fastener holes 7a of fixing portions 7 of the instrument panel I and fastener holes 3a of fixing portions 3 of the CDU 2.

In the above-described procedure, when the CDU 2 is to be electrically connected to the body-side wire harness W/H, the work of fitting the connectors 5 is performed manually. This results in problems, such as that the number of operation steps is increased and the efficiency of work is low.

One method for solving the above-described problems to fix the connectors 5 at a prescribed position in advance and to connect the CDU-side connectors with the connectors 5 at the same time that the CDU 2 is fixed to the instrument panel I.

However, to make a decorative plate 8 of the CDU 2 flush with a decorative surface on the instrument panel I side, the fixing portions 3 of the CDU 2 and the fixing portions 7 of the instrument panel I are provided on the front side. On the other hand, the position where the connectors of the CDU 2 are connected with the connectors 5 inside the instrument panel I is usually located inside the instrument panel I, distant from the front side. Since the connector fitting position is distant from the position where the CDU 2 is fixed to the instrument panel I, it is very difficult to fix the CDU 2 to the instrument panel I while positioning the CDU 2 close enough to the instrument panel I to be able to manually connect the wire harness-side and CDU-side connectors.

SUMMARY OF THE INVENTION

The present invention has been made in view of the above-described problems, and an object of the invention is therefore to make it possible to fix a display unit to an instrument panel in such a manner that the display unit is positioned with respect to the instrument panel within dimensional allowances for the connector fitting and to automatically connect CDU-side connectors with instrument panel-side connectors at the same time that the CDU is fixed to the instrument panel.

To attain the above-described objects, the invention provides a display unit attachment structure, such as a center display unit attachment structure, that attaches a display unit, such as a center display unit (CDU), to an instrument panel of an automobile. The attachment structure includes a pair of brackets projecting toward a compartment from the instrument panel, inside surfaces formed on the brackets and facing each other, the inside surfaces having guide grooves, and at least one first connector fixed with respect to a surface of the instrument panel between the brackets. The CDU has a main body including two side walls, and guide pins project from the two side walls. At least one second connector is fixed with respect to a back surface of the main body. The CDU is attached to the brackets by sliding the guide pins in the guide grooves, whereby the second connector is automatically connected with the first connector.

With the above-described configuration, when the CDU is attached to the instrument panel, the guide pins of the CDU slide while engaging the guide grooves of the brackets. As a result, the CDU is guided to a correct position and then attached to the instrument panel, and the CDU-side connectors can automatically be positioned with respect to and connected with the instrument panel-side connectors. Therefore, the CDU attachment work and connector fitting work can be performed at the same time, and hence the number of operation steps can be reduced.

A click projection may project from a surface of the guide grooves between a positioning portion of the guide grooves and an entrance of the guide grooves. This provides to an operator a "click" sensation when the CDU is attached.

With this configuration, when the CDU is attached to the brackets by sliding the guide pins in the guide grooves, each guide pin goes over the click projection at the position between the end of the guide groove and the entrance of the guide groove and is placed in the positioning portion at the end of the guide groove. An operator who is attaching the CDU can sense the "click" at or before completion of the attachment.

The click projection may also serve to restrict a return of the guide pins after the positioning.

A support portion that supports the guide pin in a slidable manner may be provided, and may, for example, project in the horizontal direction from a bottom side of each of the guide grooves. For example, if the brackets are made of sheet metal or the like, the guide grooves may be formed by cutting slots into the sheet metal, and the support portions may be formed by bending down the still-attached cut-out portion until it projects horizontally. An elastic member for vibration absorption may be provided on a top surface of the support portions.

That is, where the guide grooves are formed by cutting slots in the surfaces of the respective brackets and bending down the cut-out portions to form support plates, the support plates can support the respective guide pins in a state that the guide pins are inserted into the positioning portions of the guide grooves. Therefore, the CDU is held more stably than if the guide grooves had been formed as simple slots from which the cut-out portions were completely removed. It is also possible, for example, to form the guide grooves as grooves having a concave cross-section, especially if the brackets are solid or have thick walls.

The elastic member or a thick coating may be provided on the top surface of each support plate. The guide pin is slid on the top surface of the elastic member and rests on the elastic member even after attachment of the CDU. Therefore, transmission of automobile body vibration to the CDU can be reduced. This can make the CDU even more stable and reduce generation of abnormal sound.

Panel-side fixing portions may be provided at projecting ends of the brackets, respectively. CPU-side fixing portions to be fastened to the respective panel-side fixing portions may be provided on the CDU. A position at which the panel-side and CDU-side fixing portions are fastened together may be distant from a position at which the connectors are connected.

Therefore, the CDU may be fastened to the brackets at a position close to the decorative surface of the CDU.

With the above-described configuration, even if the position at which the CDU and the brackets are fastened together is distant from the connector fitting position, the decorative surface of the CDU can be positioned accurately with respect to the decorative surface of the instrument panel because accurate alignment of the connectors is achieved by the guide pins and the guide grooves.

BRIEF DESCRIPTION OF THE DRAWINGS

The foregoing and other features of the present invention are described in or are apparent from the following detailed description, which refers to the accompanying drawings, wherein:

FIG. 1 is a perspective view showing a center display unit (CDU) according to an embodiment of the present invention before attachment;

FIG. 2 is an enlarged view showing main parts of a guide groove of each metal bracket;

FIG. 3 is a sectional view taken along line A—A of FIG. 2;

FIGS. 4(A)–4(C) show how a guide pin slides in the guide groove;

FIG. 5 is a sectional view showing a state in which the guide pin is held by an end portion of the guide groove;

FIGS. 6(A)–6(C) are sectional views of a main part showing how the CDU is fixed to the brackets at positions close to a decorative surface;

FIG. 7 is a view illustrating a place where a CDU is to be conventionally installed; and FIG. 8 is a perspective view illustrating a conventional attachment structure for a CDU.

DETAILED DESCRIPTION OF PREFERRED EMBODIMENTS

As shown in FIG. 1, to enable attachment of a center display unit (abbreviated as "CDU") 10, in which manipulation devices, indicators, and/or the like of audio equipment, an air conditioner, and/or the like are provided, a metal plate 19 from which a pair of (right and left) brackets 20 project is provided in an instrument panel I of an automobile in a central portion that is located between the driver's seat and the front passenger seat. At the same time that the CDU 10 is attached to the brackets 20, a CDU-side connector 27 is automatically connected with a corresponding connector 25 that is provided on an end portion 24 of the brackets 20 in advance.

The metal plate 19 is provided with a pair of (right and left) brackets 20 that have, for example, generally rectangular pyramid shapes and project from the metal plate 19. A bottom wall 26 connects the bottom ends of tip portions of the respective brackets 20. CDU fixing portions 22 are provided at the tips of the respective brackets 20, and the end portion 24 is connected with base portions of the respective brackets 20. The connector 25 that is connected to a wire harness (not shown) is fixed on the end portion 24 so as to project through an opening of the end portion 24. Instead of providing the end portion 24, an opening may be formed in a portion of a panel plate of the instrument panel I that corresponds to the end portion 24. The connector 25 maybe fixed to the instrument panel I so as to project through that opening.

Surfaces of the right and left brackets 20 that face each other are recessed over a length from the tips (right side in FIG. 2) to positions close to the base portions so as to form guide grooves 21a. The guide grooves may be formed by cutting slots in the walls of the respective brackets 20 and, if desired, bending down the cut-out portions, or portions thereof, to form support plates 21d described below. It is also possible, for example, to form the guide grooves 21a as grooves that have a concave cross-section and do not penetrate all the way through the walls of the brackets 20, especially if the brackets 20 are solid or have thick walls.

As shown in FIG. 2, each guide groove 21a may have the following structure. A taper portion 21e is provided on the tip side (entrance side) of the brackets 20. An instrument panel-side end portion of the guide grooves 21a serves as a positioning portion 21c. The bottom side of the guide grooves 21a is formed with a projection 21b provided between the positioning portion 21c and the taper portion 21e, preferably at a position near the positioning portion 21c.

At the positioning portion 21c, as shown in FIG. 3, the support plate 21d may project in the horizontal direction from the bottom periphery of the guide groove 21a so as to face away from an inside surface 21. An elastic member 23 made of polyurethane, rubber, or the like may be provided on the top surface of each support plate 21d.

As shown in FIG. 1, a positioning pin 22a projects from the CDU fixing portion 22 that is provided at the tip of each bracket 20. A fastener hole 22b is formed through the CDU fixing portion 22 side by side with the positioning pin 22a. A portion of the CDU fixing portion 22 that is integral with the inside surface 21 is notched to form an entrance portion 22c that is continuous with the taper portion 21e of the guide groove 21a. As shown in FIGS. 6(A)–6(C), a nut N may be attached to the back surface of the CDU fixing portion 22 so as to be integral with the CDU fixing portion and to share the same axis with the fastener hole 22b.

As shown in FIG. 1, the CDU 10 is provided with a main body 12 that houses audio equipment, air-conditioner components and/or the like, and a decorative plate 11 that is provided on the front side of the main body 12 and in which manipulation devices, indicators, and the like may be provided. Guide pins 14 project from the right and left surfaces of the main body 12 at prescribed positions, and a pair of fixing portions 13 are provided on the right and left sides of the main body 12 near the side of the decorative plate 11 so as to project in opposite directions. Each fixing portion 13 is formed with a positioning hole 13a and a fastener hole 13b. The connector 27 to be connected with the corresponding connector 25 is provided on the back side of the main body 12 at a prescribed position.

Next, a procedure of attaching the CDU 10 will be described.

As indicated by an arrow in FIG. 1, the guide pins 14 of the CDU 10 are inserted into the entrance portions 22c of the guide grooves 21a of the brackets 20 of the instrument panel I. In this operation, the guide pins 14 can easily be guided into the guide grooves 21a because the guide grooves 21a have the taper portions 21e on the entrance side.

As shown in FIGS. 4(A)–4(C), the guide pins 14 that have been inserted into the guide grooves 21a go over the projections 21b and are positioned and held by the positioning portions 21c upon reaching the end portions of the guide grooves 21a.

As shown in FIG. 5, the guide pins 14 thus positioned can be supported stably by the support plates 21d. Further, the elastic members 23, each of which is interposed between the guide pin 14 and the support plate 21d in this state, can absorb vibration.

On the other hand, on the decorative plate 11 side, the fixing portions 13 of the CDU 10 come close to the CDU fixing portions 22 that are provided at the tips of the respective brackets 20 as shown in FIG. 6(A), and the positioning pins 22a are inserted into the positioning holes 13a and thereby positioned as shown in FIG. 6(B). Then, a fastener such as bolt B is inserted into the fastener holes 13b and 22b that are aligned with each other. The guide pins 14 guided by the guide grooves 21a are rotatable in the guide grooves 21a and hence the CDU 10 itself can be inclined with the guide pins 14 serving as supporting points. Therefore, the positioning holes 13a can easily be positioned with respect to the respective positioning pins 22a.

As described above, on the back side of the CDU 10, the guide pins 14 are guided to the prescribed positions by the guide grooves 21a of the brackets 20, and the decorative plate 11 of the CDU 10 is positioned with respect to the CDU fixing portions 22 at the tips of the brackets 20 by the positioning pins 22a. Therefore, the connector 27 provided on the back surface of the main body 12 of the CDU 10 can automatically be positioned with respect to and connected with the corresponding connector 25 on the bracket 20 side. That is, the positioning and interconnection of the connectors occur as a result of sliding the CDU into position, and do not require a separate operation or action by the operator.

Since the CDU fixing portions 22 at the tips of the brackets 20 are fixed to the CDU 10 at positions close to the decorative plate 11, the decorative plate 11 of the CDU 10 can be positioned accurately with respect to the surrounding decorative surface.

Instead of the elastic member 23 provided on the top surface of the support plate 21d that is provided adjacent to the end of each guide groove 21a, a thick coating may be formed on the respective support plates 21d so that the guide pins 14 are closely fitted into the respective positioning portions 21c while scraping off part of the coatings as they slide on the support plates 21d. The coating may be of polyurethane, rubber or the like.

As is apparent from the above description, according to the invention, when the CDU is attached to the instrument panel, the guide pins of the CDU slide in the guide grooves of the brackets. As a result, the CDU-side connector can automatically be positioned with respect to and connected with the corresponding instrument panel-side connector. Therefore, connector fitting work can be performed automatically by merely attaching the CDU and hence the work efficiency can be increased.

The click projection projects from the bottom of the guide groove at a position on the front side of the positioning portion that is located at the end of the guide groove of each bracket. This gives a "click" sensation to the operator when the guide pins of the CDU go over the click projections, and the operator can immediately recognize completion of the attachment. The projections also serve to restrict return of the positioned guide pins.

Where the guide grooves are formed as slots in walls of the right and left brackets that face each other, each support plate is formed so as to project in the horizontal direction from the bottom periphery of the end portion of each guide groove. In this case, the support plates can support the respective guide pins in a stable manner. The elastic member may be provided on the top surface of each support plate to absorb vibration of the support plates and thereby reduce transmission of vibration to the guide pins.

The fixing portions of the CDU are provided near the decorative surface of the CDU, and the CDU fixing portions on the brackets are provided at the projecting ends of the brackets, respectively. Even if the CDU is fixed to the brackets at a position that is distant from the connector fitting position, the decorative surface of the CDU can be accurately positioned with respect to a surrounding decorative surface, that is, within dimensional tolerances for the connectors.

While the invention has been described in conjunction with the specific embodiments described above, many equivalent alternatives, modifications and variations may become apparent to those skilled in the art when given this disclosure. Accordingly, the exemplary embodiments of the invention as set forth above are considered to be illustrative and not limiting. Various changes to the described embodiments may be made without departing from the spirit and scope of the invention.

What is claimed is:

1. A display unit attachment structure that attaches a display unit to an instrument panel of an automobile, comprising:

a pair of brackets projecting toward a compartment from the instrument panel, each bracket having a guide groove formed therein;

at least one first connector fixed with respect to a surface of the instrument panel;

a display unit having a main body including two side walls, guide pins projecting from each of the two side walls, and at least one second connector fixed with respect to a back surface of the main body;

first fixing portions provided at ends of the brackets; and second fixing portions provided on the display unit near a decorative surface of the display unit, wherein the first fixing portions and the second fixing portions engage to fix the display unit to the instrument panel;

wherein the display unit is attached to the brackets by sliding the guide pins in the guide grooves, whereby the at least one second connector is automatically connected with the at least one first connector.

2. The display unit attachment structure according to claim 1, wherein one of the first fixing portions and the second fixing portions include positioning pins, and the other of the first fixing portions and the second fixing portions include positioning holes engageable with the positioning pins.

3. A display unit attachment structure that attaches a display unit to an instrument panel of an automobile, comprising:

a pair of brackets projecting toward a compartment from the instrument panel, each bracket having a guide groove formed therein;

at least one first connector fixed with respect to a surface of the instrument panel;

a display unit having a main body including two side walls, guide pins projecting from each of the two side walls, and at least one second connector fixed with respect to a back surface of the main body; and support portions that support the guide pins in a slidable manner, each support portion projecting in a horizontal direction from a bottom side of a respective one of the guide grooves;

wherein the display unit is attached to the brackets by sliding the guide pins in the guide grooves, whereby the at least one second connector is automatically connected with the at least one first connector;

wherein the brackets each have a wall formed of sheet material, the guide grooves are provided as slots in the walls formed of sheet material, and a cut-out portion of each slot is bent down to form a respective one of the support portions.

4. A display unit attachment structure that attaches a display unit to an instrument panel of an automobile, comprising:

a pair of brackets projecting toward a compartment from the instrument panel, each bracket having a guide groove formed therein;

at least one first connector fixed with respect to a surface of the instrument panel;

a display unit having a main body including two side walls, guide pins projecting from each of the two side walls, and at least one second connector fixed with respect to a back surface of the main body;

support portions that support the guide pins in a slidable manner, each support portion projecting in a horizontal direction from a bottom side of a respective one of the guide grooves; and an elastic member provided on a top surface of each support portion, wherein the display unit is attached to the brackets by sliding the guide pins in the guide grooves, whereby the at least one second connector is automatically connected with the at least one first connector.

5. The display unit attachment structure according to claim 4, wherein the thin elastic member is of at least one of polyurethane and rubber.

6. A vehicle having the display unit attachment structure according to claim 4 incorporated therein.

7. The display unit attachment structure according to claim 4, further comprising:

a projection projecting from a bottom side of each of the guide grooves between a positioning portion and an entrance of the guide groove.

8. The display unit attachment structure according to claim 7, wherein the projection is close to the positioning portion.

* * * * *